(12) United States Patent
Comerford

(10) Patent No.: US 6,892,675 B1
(45) Date of Patent: May 17, 2005

(54) CAT TOY

(76) Inventor: Paul H. Comerford, 38073 Augusta Dr., Murrieta, CA (US) 92563

(*) Notice: Subject to any disclaimer, the term of this patent is extended or adjusted under 35 U.S.C. 154(b) by 27 days.

(21) Appl. No.: 10/801,873

(22) Filed: Mar. 16, 2004

(51) Int. Cl.⁷ .......................................... A01K 29/00
(52) U.S. Cl. ........................... 119/708; 119/706
(58) Field of Search ................... 119/711, 702, 707, 119/708, 706

(56) References Cited

U.S. PATENT DOCUMENTS

| | | | |
|---|---|---|---|
| 5,103,770 A * | 4/1992 | Berkovich | 119/708 |
| 5,119,001 A * | 6/1992 | Moore et al. | 318/257 |
| 5,595,141 A * | 1/1997 | Udelle et al. | 119/706 |
| 5,675,225 A * | 10/1997 | Moore et al. | 318/257 |
| 5,713,306 A * | 2/1998 | Johnson | 119/706 |
| 5,806,464 A * | 9/1998 | Willinger et al. | 119/706 |
| 5,875,737 A * | 3/1999 | Boshears | 119/706 |
| 5,881,679 A * | 3/1999 | Hann | 119/708 |
| 5,924,387 A * | 7/1999 | Schramer | 119/708 |
| 5,941,196 A * | 8/1999 | Domanski | 119/708 |
| 6,016,771 A * | 1/2000 | Baiera et al. | 119/708 |
| 6,345,593 B1 * | 2/2002 | Stewart et al. | 119/706 |
| 6,743,072 B2 * | 6/2004 | Nelson et al. | 446/490 |

* cited by examiner

Primary Examiner—Yvonne R. Abbott
(74) Attorney, Agent, or Firm—Loyal McKinley Hanson

(57) ABSTRACT

A cat toy apparatus for occupying a cat or functioning as a hunting decoy includes a support structure, a motor assembly on the support structure that includes a motor and an electronic circuit for powering the motor, an elongated member having a proximal end portion connected to the motor and a distal end portion disposed radially outwardly from the central axis, and an object connected to the distal end portion by a flexible line. The motor assembly is adapted to rotate the elongated member in order to thereby move the object about the central axis of the support structure for purposes of attracting the attention of an animal, preferably with haphazard, unpredictable movement that a cat finds enticing. The electronic circuit may include a sensor for detecting an animal in close proximity to the apparatus in order to automatically turn the electric motor on.

14 Claims, 5 Drawing Sheets

US 6,892,675 B1

CAT TOY

BACKGROUND OF THE INVENTION

1. Technical Field

This invention relates generally to pet supplies, and more particularly to a toy for stimulating and exercising cats.

2. Description of Related Art

Cat toys help keep cats occupied, exercised, and out of trouble. In addition, cat owners enjoy watching their cats play. For these and other reasons, many cat toys are commercially available at pet stores and other retail outlets. However, the right combination of cat-attracting, owner-pleasing, and child-safe attributes remain somewhat elusive and so a need exists for a better cat toy.

SUMMARY OF THE INVENTION

This invention addresses the need outlined above by providing a motorized wand from which a cat-attractive object is tethered. An electronic circuit starts and stops rotation of the wand about a motor-supporting structure at various times and at adjustable speeds. The cat is kept busy, exercised, and out of trouble with an owner-pleasing apparatus that is safe for children to use.

To paraphrase some of the more precise language appearing in the claims and further introduce the nomenclature used, a cat toy apparatus constructed according to the invention includes a base and a motor-supporting structure on the base. An electric motor within the motor-supporting structure rotates an object-holding arm that extends upwardly and radially outwardly from the motor-supporting structure to a cat-attractive object that is connected by a flexible line to the arm.

The base has a hollow interior. The motor-supporting structure also has a hollow interior that extends along a central axis. With the base resting on a horizontal support surface, the motor-supporting structure extends upwardly from the base with the central axis disposed vertically and the electric motor aligned with the central axis.

The object-holding arm is connected to the motor. It includes an elongated member having a proximal end portion connected to the motor and a distal end portion disposed upwardly and radially outwardly from the motor-supporting structure. The cat-attracting object is connected with the flexible line to the distal end portion of the object-holding arm. An electronic circuit in the base serves as means for powering the electric motor in order to rotate the object-holding arm and thereby move the cat-attracting object about the motor-supporting structure.

In one embodiment, the electronic circuit includes means for enabling a user to select a running time after which the electric circuit automatically turns the electric motor off, means for enabling a user to select a speed at which the electric motor operates, and means for automatically reversing motor direction at various time intervals. The electronic circuit may also include means for detecting a cat in close proximity to the apparatus and for automatically turning the electric motor on upon so detecting the cat.

Preferably, the cat toy apparatus includes at least four base-stabilizing members on the base that are rotatable by a user from deployed positions, in which the base-stabilizing members extend outwardly from the base, to storage positions in which the base-stabilizing members are retracted from the deployed positions. In addition, the base includes an upper side, the electronic circuit includes a circuit-controlling knob, and cat-ear-depicting graphics cat-eye-depicting graphics and cat-whisker-depicting graphics on the upper side of the base that combine with the circuit-controlling knob to depict a cat face for which the circuit-controlling knob depicts a cat nose. Furthermore, the motor includes a rigid shaft extending upwardly and radially outwardly from the motor-supporting structure to a terminal end portion of the rigid shaft, and the object-holding arm includes a slender, plastic wand that is adapted to be removable attached to the terminal end portion of the rigid shaft in slide-on engagement of the terminal end portion in order to facilitate arm replacement.

Thus, the invention provides a cat toy apparatus having just the right combination of cat-attracting, owner-pleasing, and child-safe attributes. The following illustrative drawings and detailed description make the foregoing and other objects, features, and advantages of the invention more apparent.

DESCRIPTION OF THE PREFERRED EMBODIMENTS

Figure 1:
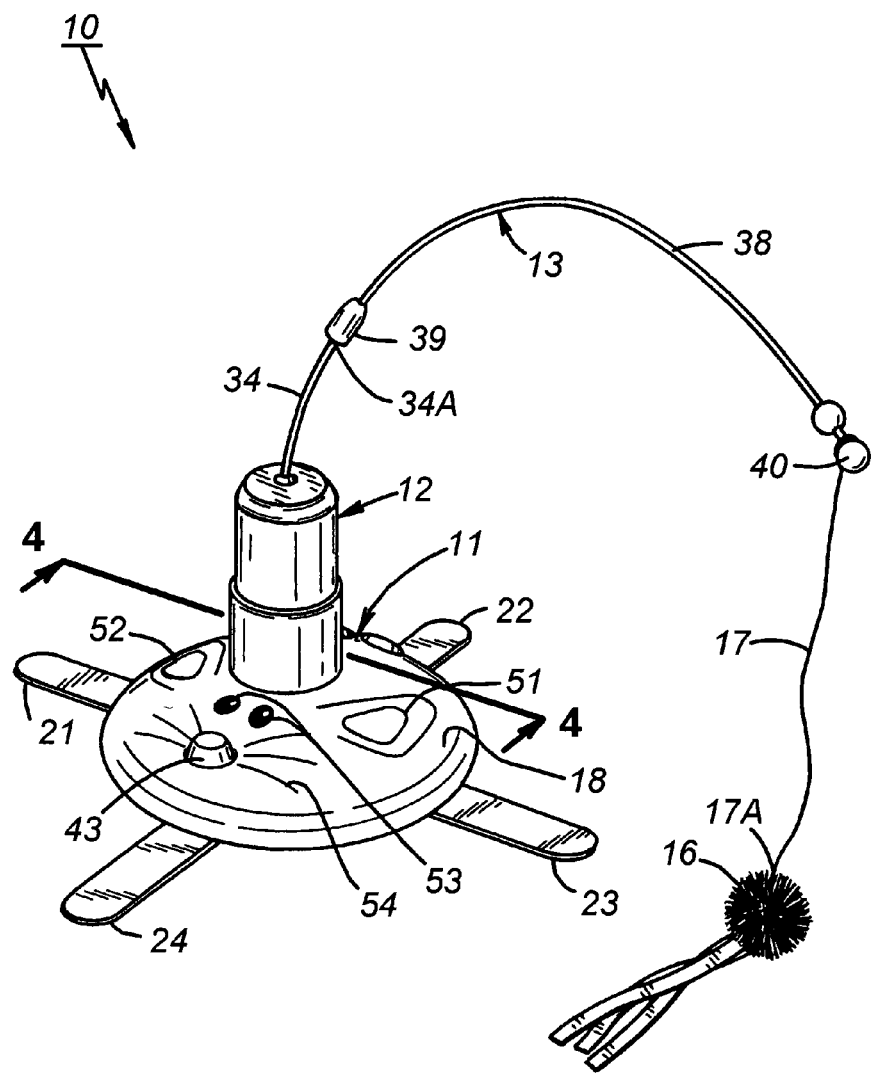
FIG. 1 of the drawings is an isometric view of a cat toy apparatus constructed according to the invention.
Figure 4:
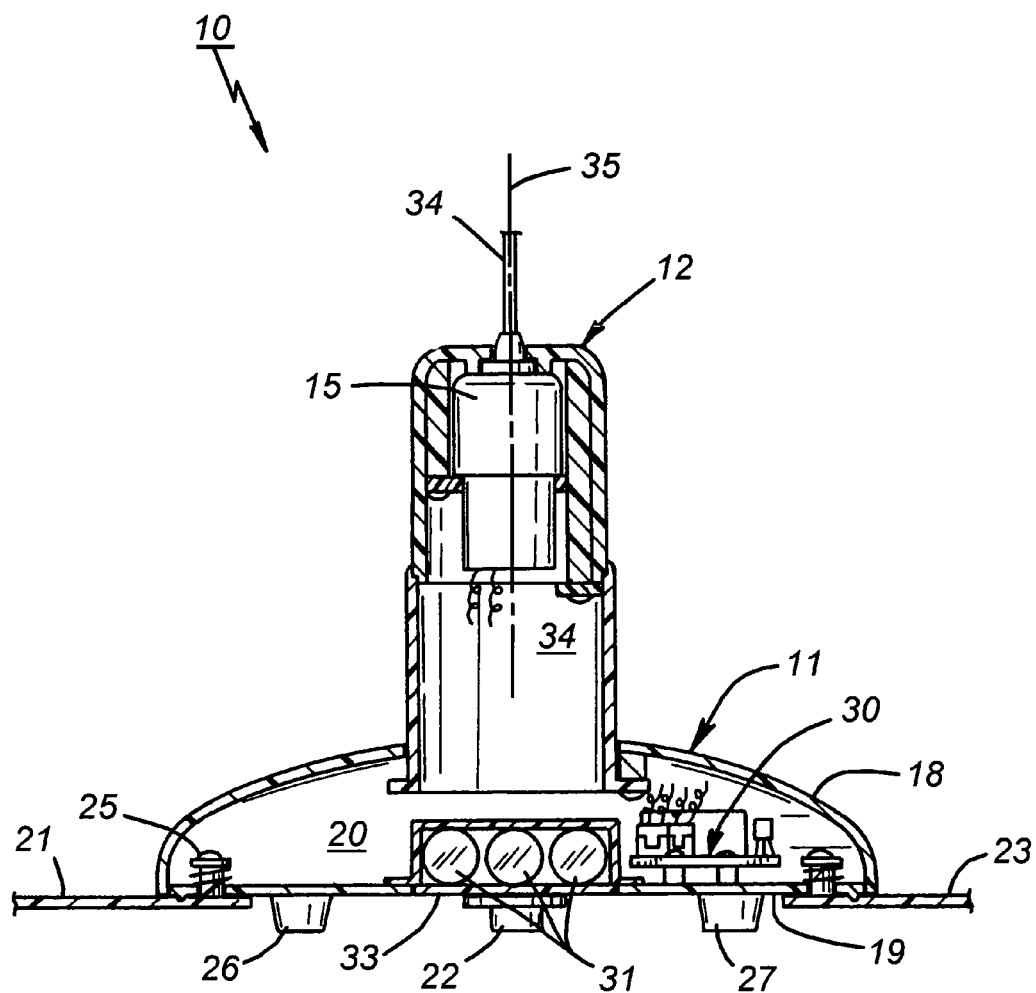
FIG. 4 is an enlarged front elevation of the cat toy apparatus with the base and motor-supporting structure in cross section as viewed in a vertical plane containing a line 4—4 in FIG. 1.
Figure 5:
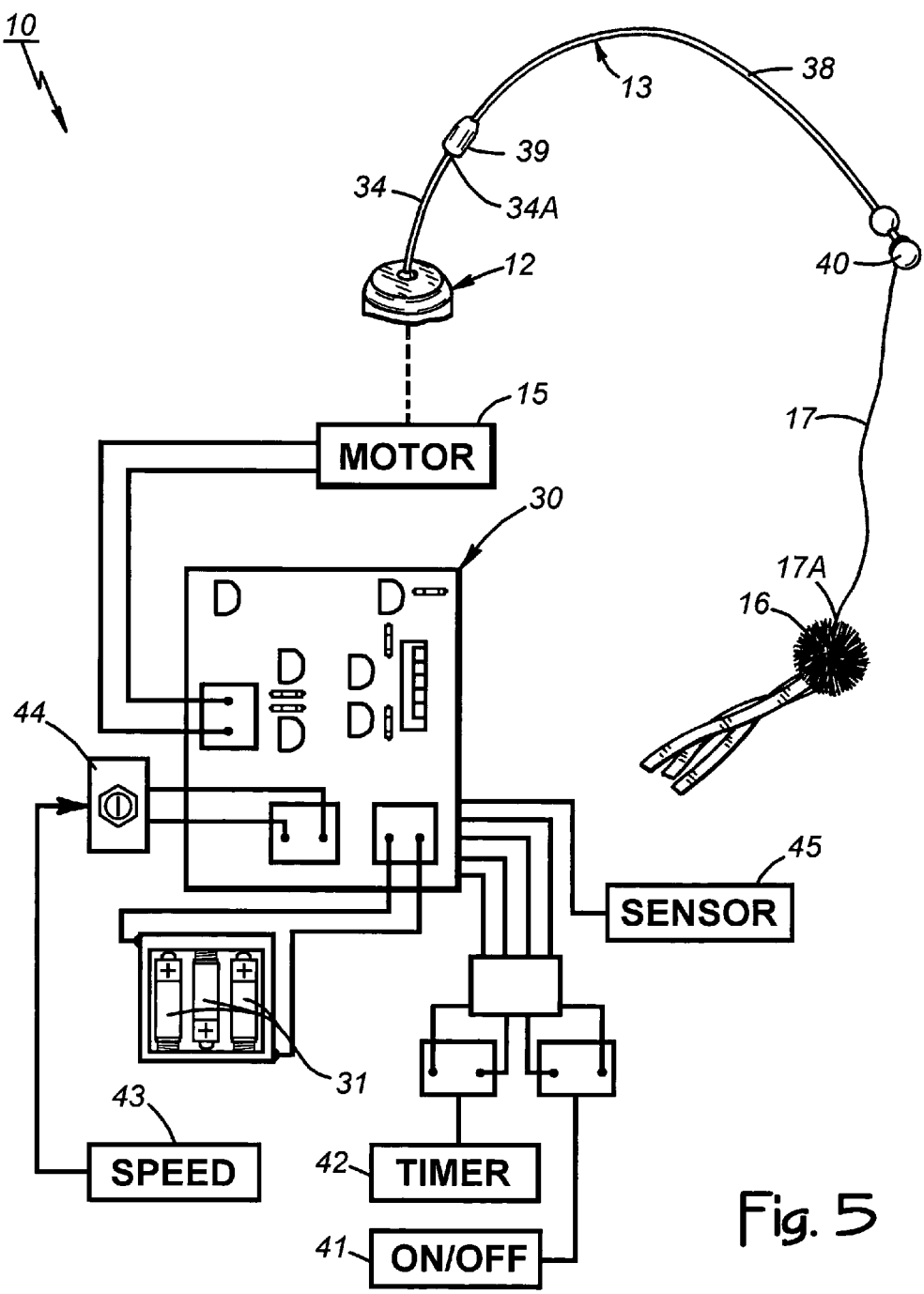
FIG. 5 is a diagrammatic representation of the electronic circuit that powers the motor used to rotate the object-holding arm and thereby move the cat-attracting object about the motor-supporting structure.

FIGS. 1–5 of the drawings show various aspects of a cat toy apparatus constructed according to the invention in the form of a cat toy 10. Generally, the cat toy 10 includes a base 11, a motor-supporting structure 12, and an object-holding arm 13. The base 11 supports the rest of cat toy 10 upon a floor or other horizontal surface 14 (FIG. 3), the structure 12 houses an electric motor 15 (FIGS. 4 and 5), and the arm 13 holds a cat-attracting object 16 on a terminal end 17A (FIG. 1) of a cord or other flexible line 17 (FIGS. 1 and 5).

The base 11 (e.g., a molded plastic component) has an upper side 18 (FIGS. 1, 3, and 4), an underside 19 (FIGS. 2, 3, and 4), and a hollow interior 20 (FIG. 4). The base 11 includes four stabilizing members in the form of four stabilizing bars 21, 22, 23, and 24 (e.g., molded plastic). They are generally similar, each being mounted pivotally on the underside 19 of the base 11 with a spring-biased retainer, such as the spring-biased retainer 25 of the stabilizing bar 21 that is identified in FIG. 4.

Figure 2:
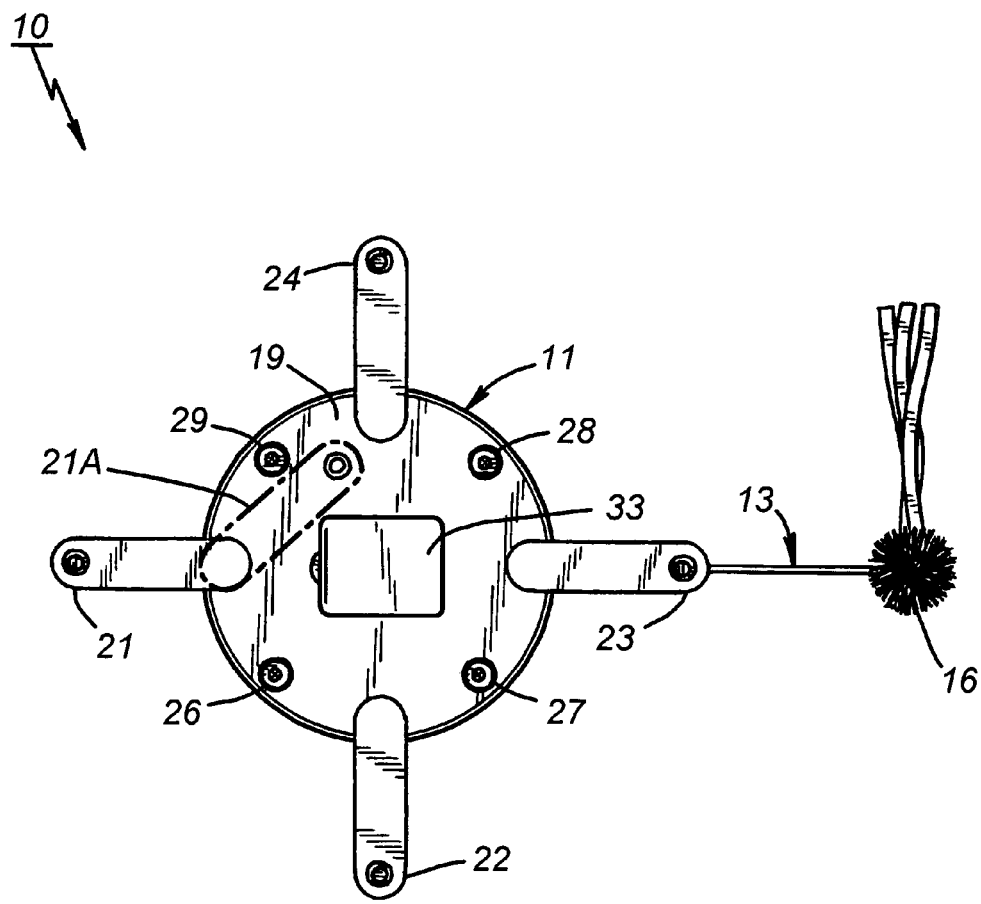
FIG. 2 is a bottom plan view of the base portion of the apparatus showing the retracted storage position of one of the base-stabilizing members with phantom lines.
Figure 3:
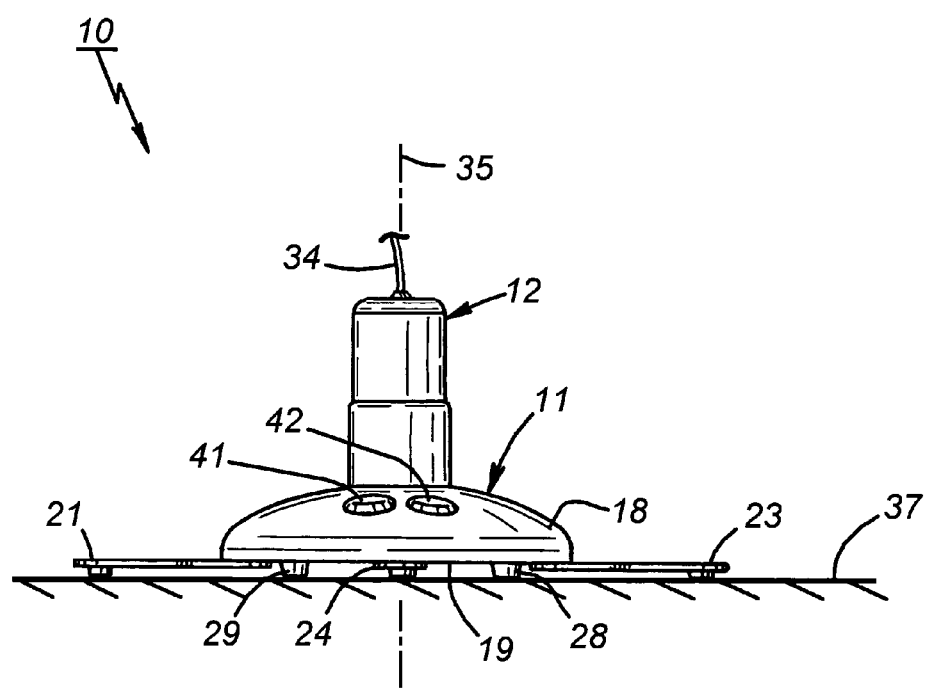
FIG. 3 is a back elevation view of the apparatus with the object-holding arm foreshortened for illustrative purposes.

That arrangement enables a user to pivot the stabilizer bars 21–24 from the deployed positions illustrated in FIGS. 1–4, in which the stabilizing bars 21–24 extend outwardly from the base 11 for base-stabilizing purposes, to retracted storage positions in which the stabilizing bars 21–24 are pivoted inwardly out of the way. In the retracted storage position of the stabilizer bar 21, for example, the stabilizer bar 21 is disposed as illustrated in FIG. 2 by phantom lines identified at reference numeral 21A. The base 11 includes four rubber feet 26, 27, 28, and 29 that the stabilizer bars 21–24 can clear when pivoted, by operation of the spring-biased retainer 25 for the stabilizing bar 21 and similar spring-biased retainers for the other stabilizing bars 22–24.

An electronic control circuit 30 located with the hollow interior 20 of the base 11 (FIG. 4) is powered by three batteries 31 that are accessible by removing a battery cover 33 shown in FIG. 2. The circuit 30 powers the electric motor 15 as described in more detail further on in this description. It functions as means for powering the electric motor 15 so that the motor 15 rotates the arm 13 and thereby moves the object 16 about the structure 12. The motor 15 may take any of various forms, including various commercially available servo or control motors. It includes a rigid curved tail 34 (e.g., a curved metal shaft) that rotates when power is supplied to the motor 15, and that imparts motion about the motor-supporting structure 12 to move the cat-attracting object 16.

The motor-supporting structure 12 (e.g., molded plastic) has a central axis 35 and a hollow interior 36 (FIG. 4) extending along the central axis 35. It is "motor-supporting" in that it supports the motor 15 atop the base 11 in alignment with the central axis 35. The motor 15 occupies a position within the hollow interior 36 such that the motor 15 (i.e., the rotational axis of the motor 15) is aligned with the central axis 35, with the tail 34 extending upwardly beyond the structure 12 and radially outward relative to the central axis 35 to a distal end portion 34A of the tail 34 that is identified in FIG. 1. The motor-supporting structure 12 is connected to the base 11 and so arranged that with the base 11 resting on a horizontal support surface 37 (FIG. 3), the motor-supporting structure 12 extends upwardly from the base 11 with the central axis 35 disposed vertically. As the motor 15 and the tail 34 rotate, the cat-attracting object 16 obits the support 12 and the central axis 35.

The object-holding arm 13 includes a slender, somewhat bendable, elongated member 38 (e.g., plastic) that is also referred to herein as a wand. The arm 13 is "object-holding" in that it holds the object 16 via the line 17. It has a proximal end portion 39 connected to the motor 15 (i.e., the tail 34 of the motor 15) and a distal end portion 40 disposed upwardly and radially outwardly from motor-supporting structure 12. The flexible line 17 is connected to the distal end portion 40. The proximal end portion 39 of the member 38 is hollow and opens proximally to form a female component that is adapted to be removably attached to the terminal end portion 34A of the rigid shaft 34 (the male component) in slide-on engagement of the terminal end portion 34A. It slides tightly onto the terminal end portion 34A to retain it there and yet it slides off when tugged upon for a quick disconnection that facilitates replacement of the object-holding arm 12. The user can readily replace the arm 12 with any of various substitute arms having different cat-attracting objects (not shown). With further regard to the object 16, it is "cat-attracting" in that it is larger than a penny (e.g., a 1.5-inch diameter fuzzy plastic ball with trailers extending from it) and it weighs less than a couple ounces (preferably less than an ounce) so that is easily moved by the motor 15 and attracts the attention of a cat. Substitute arm-and-object assemblies may be provided so that the user can pick out and use a favorite color and design.

As an idea of size, the illustrated cat toy 10 has a circular portion of the base 11 measuring about seven inches in diameter. In their deployed positions, the stabilizing bars 21–24 extend outwardly from the rest of the base 11 about three inches. The support 12 stands about four inches upwardly beyond the upper side 18 of the base so that the support 12 extends to about six inches above the horizontal support surface 37 shown in FIG. 3. In addition, the tail 34 extends about three and one half inches beyond the support 12, and the elongated member extends about twelve inches beyond that, with the line 17 measuring about ten inches long. Of course, those dimensions may vary. A cat toy may be constructed according to the inventive concepts described in any of various sizes.

Turning now to FIG. 5, it shows further details of the electronic control circuit 30. The circuit 30 is powered by the batteries 31 and functions as means for powering (i.e., controlling) the motor 15 according to input from a user via an On/Off button 41, a timer button 42, and a speed-controlling knob 43 connected to a variable resistor 44. In other words, the circuit 30 functions as means for powering the motor 15 in order to rotate the object-holding arm 13 and thereby move the cat-attracting object 16 about the motor-supporting structure 12 (preferably in a haphazard manner that is unpredictable to a cat). Input to the circuit 30 is also provided by a sensor 45 that functions as means for detecting a cat in close proximity to the cat toy 10 in order to automatically turn the circuit 30 on and power the motor 15 when the presence of a cat is so detected.

One of ordinary skill in the art may use well-known components and circuit design techniques for an electronic control circuit that controls the motor 15 as desired. The illustrated circuit 30 is adapted to function as means for enabling a user to select a running time after which the electric circuit automatically turns the electric motor off. After turning the circuit 30 on with the On/Off button 41, the user depresses the timer button 42 a selected number of times (up to a maximum of eight times), each depression causing the circuit 30 to power the motor 15 for a fifteen-minute interval so that a total of eight depressions, for example, results in the circuit 30 powering the motor 15 for two hours. If the timer button 42 is not depressed after turning on the circuit 30, the unit continues to run until the user turns it off or the batteries drain sufficiently.

The circuit 30 is also adapted to function as means for enabling a user to select a speed at which the electric motor operates. The user turns the speed-controlling knob 43 and the circuit 30 powers the motor 15 accordingly. In addition, the circuit 30 is adapted to function as means for automatically reversing the direction of the motor 15 (i.e., reversing motor direction) at various times. One of ordinary skill may use well-known circuit elements and circuit design techniques to accomplish that operational characteristic. Reversing the motor 15 at various times cause the cat-attracting object 16 to dance about in a manner provocative to cats.

In order to make the cat toy 10 even more attractive to children, graphics are provided on the upper surface 18 of the base 11 (FIG. 1). Thus, the base 11 includes cat-ear-depicting graphics 51, cat-eye-depicting graphics 52, and cat-whisker-depicting graphics 53 on the upper side 18. They combine with the circuit-controlling knob 43 to depict a cat face. The knob 43 depicts a cat nose.

Thus, the invention provides a cat toy apparatus having just the right combination of cat-attracting, owner-pleasing, and child-safe attributes, and it can be configured for use as a hunting decoy. It includes a support structure that is adapted to rest upon a horizontal support surface with its central axis disposed vertically. A motor assembly on the support structure includes an electric motor and an electronic circuit for powering the electric motor. An elongated member has a proximal end portion connected to the motor and a distal end portion from which an object is tethered by a flexible line. The motor assembly is adapted to function as means for rotating the elongated member in order to thereby move the object about the is central axis of the support structure for purposes of attracting the attention of an animal, preferably moving the object with haphazard, unpredictable movement that cats and/or other animals find enticing. Although an exemplary embodiment has been shown and described, one of ordinary skill in the art may make many changes, modifications, and substitutions without necessarily departing from the spirit and scope of the invention.

What is claimed is:

1. A cat toy apparatus, comprising:
   a base having a hollow interior;
   a motor-supporting structure having a central axis and a hollow interior extending along the central axis, which motor-supporting structure is connected to the base and so arranged that with the base resting on a horizontal support surface, the motor-supporting structure extends upwardly from the base with the central axis disposed vertically;
   an electric motor located within the hollow interior of the motor-supporting structure in alignment with the central axis;
   a object-holding arm connected to the motor, the object-holding arm including an elongated member having a proximal end portion connected to the motor and a distal end portion disposed upwardly and radially outwardly from the motor-supporting structure;
   a cat-attracting object;
   a flexible line connecting the cat-attracting object to the distal end portion of the object-holding arm; and
   means for powering the electric motor in order to rotate the object-holding arm and thereby move the cat-attracting object about the motor-supporting structure;
   said cat toy further comprising at least four base-stabilizing members on the base that are rotatable by a user from deployed positions, in which the base-stabilizing members extend outwardly from the base, to storage positions in which the base-stabilizing members are retracted from the deployed positions.

2. A cat toy apparatus as recited in claim 1, wherein the means for powering the electric motor includes an electronic circuit located within the hollow interior of the base.

3. A cat toy apparatus as recited in claim 2, wherein the electronic circuit is adapted to function as means for enabling a user to select a running time after which the electric circuit automatically turns the electric motor off.

4. A cat toy apparatus as recited in claim 2, wherein the electronic circuit is adapted to function as means for enabling a user to select a speed at which the electric motor operates.

5. A cat toy apparatus as recited in claim 2, wherein the electronic circuit is adapted to function as means for automatically reversing motor direction at various times.

6. A cat toy apparatus as recited in claim 2, wherein the electronic circuit is adapted to function as means for detecting an animal in close proximity to the apparatus in order to automatically turn the electronic circuit on and power the electric motor when the presence of an animal is so detected.

7. A cat toy apparatus as recited in claim 1, wherein:
   the means for powering the electric motor includes a battery-powered electronic circuit located within the hollow interior of the base;
   the electronic circuit is adapted to function as means for enabling a user to select a running time after which the electric circuit automatically turns the electric motor off;
   the electronic circuit is adapted to function as means for enabling a user to select a speed at which the electric motor operates; and
   the electronic circuit is adapted to function as means for automatically reversing motor direction at various time intervals.

8. A cat toy apparatus as recited in claim 7, wherein the electronic circuit includes means for detecting an animal in close proximity to the apparatus in order to automatically turn the electronic circuit on and power the electric motor when the presence of an animal is so detected.

9. A cat toy apparatus, comprising:
   a base having a hollow interior;
   a motor-supporting structure having a central axis and a hollow interior extending along the central axis, which motor-supporting structure is connected to the base and so arranged that with the base resting on a horizontal support surface, the motor-supporting structure extends upwardly from the base with the central axis disposed vertically;
   an electric motor located within the hollow interior of the motor-supporting structure in alignment with the central axis;
   a object-holding arm connected to the motor, the object-holding arm including an elongated member having a proximal end portion connected to the motor and a distal end portion disposed upwardly and radially outwardly from the motor-supporting structure;
   a cat-attracting object;
   a flexible line connecting the cat-attracting object to the distal end portion of the elongated member; and
   means for powering the electric motor in order to rotate the object-holding arm and thereby move the cat-attracting object about the motor-supporting structure;
   wherein the means for powering the electric motor includes an electronic circuit located within the hollow interior of the base;
   wherein the base includes an upper side;
   wherein the electronic circuit includes a circuit-controlling knob; and
   wherein the base includes cat-ear-depicting graphics, cat-eye-depicting graphics, and cat-whisker-depicting graphics on the upper side that combine with the circuit-controlling knob to depict a cat face, for which cat face the circuit-controlling knob depicts a cat nose.

10. A cat toy apparatus, comprising:
   a base having a hollow interior;
   a motor-supporting structure having a central axis and a hollow interior extending along the central axis, which motor-supporting structure is connected to the base and so arranged that with the base resting on a horizontal support surface, the motor-supporting structure extends upwardly from the base with the central axis disposed vertically;
   an electric motor located within the hollow interior of the motor-supporting structure in alignment with the central axis;
   an object-holding arm connected to the motor, the object-holding arm including an elongated member having a proximal end portion connected to the motor and a distal end portion disposed upwardly and radially outwardly from the motor-supporting structure;
   a cat-attracting object;
   a flexible line connecting the cat-attracting object to the distal end portion of the elongated member; and means for powering the electric motor in order to rotate the object-holding arm and thereby move the cat-attracting object about the motor-supporting structure;

wherein the motor includes a rigid shaft extending upwardly and radially outwardly from the motor-supporting structure to a terminal end portion of the rigid shaft; and wherein the proximal end portion of the elongated member is adapted to be removably attached to the terminal end portion of the rigid shaft in slide-on engagement of the terminal end portion in order to facilitate replacement of the object-holding arm.

11. A cat toy apparatus, comprising:

a base having a hollow interior;

a motor-supporting structure having a central axis and a hollow interior extending along the central axis, which motor-supporting structure is connected to the base and so arranged that with the base resting on a horizontal support surface, the motor-supporting structure extends upwardly from the base with the central axis disposed vertically;

an electric motor located within the hollow interior of the motor-supporting structure in alignment with the central axis;

a object-holding arm connected to the motor, the object-holding arm including an elongated member having a proximal end portion connected to the motor and a distal end portion disposed upwardly and radially outwardly from the motor-supporting structure;

a cat-attracting object;

a flexible line connecting the cat-attracting object to the distal end portion of the object-holding arm; and means for powering the electric motor in order to rotate the object-holding arm and thereby move the cat-attracting object about the motor-supporting structure;

said means for powering the electric motor including a battery-powered electronic circuit located within the hollow interior of the base such that the electronic circuit is adapted to function as means for enabling a user to select a running time after which the electric circuit automatically turns the electric motor off, means for enabling the user to select a speed at which the electric motor operates, and means for automatically reversing motor direction at various time intervals;

said motor including a rigid shaft extending upwardly and radially outwardly from the motor-supporting structure to a terminal end portion of the rigid shaft, the object-holding arm including a slender, plastic wand, and the slender plastic wand is adapted to be removably attached to the terminal end portion of the rigid shaft in slide-on engagement of the terminal end portion in order to facilitate replacement of the object-holding arm; and the apparatus further comprising at least four base-stabilizing members on the base that are adapted to be rotated from deployed positions, in which the base-stabilizing members extend outwardly from the base, to storage positions in which the base-stabilizing members are retracted from the deployed positions.

12. A cat toy apparatus, comprising:

a support structure having a central axis, which support structure is adapted to rest upon a horizontal support surface with the central axis disposed vertically;

a motor assembly on the support structure, including an electric motor and an electronic circuit for powering the electric motor;

an elongated member having a proximal end portion that is connected to the electric motor and a distal end portion that is disposed upwardly from the motor and radially outwardly from the central axis;

a flexible line connected to the distal end portion of the elongated member, the flexible line having a terminal end; and an object connected to the terminal end of the flexible line;

wherein the motor assembly is adapted to function as means for rotating the elongated member in order to thereby move the object about the central axis of the support structure for purposes of attracting the attention of an animal;

wherein the motor includes a rigid shaft extending upwardly and radially outwardly from the motor-supporting structure to a terminal end portion of the rigid shaft; and wherein the proximal end portion of the elongated member is adapted to be removably attached to the terminal end portion of the rigid shaft in slide-on engagement of the terminal end portion in order to facilitate replacement of the elongated member.

13. An animal-attracting apparatus, comprising:

a base having a hollow interior;

a motor-supporting structure having a central axis and a hollow interior extending along the central axis, which motor-supporting structure is connected to the base and so arranged that with the base resting on a horizontal support surface, the motor-supporting structure extends upwardly from the base with the central axis disposed vertically;

an electric motor located within the hollow interior of the motor-supporting structure in alignment with the central axis;

a object-holding arm connected to the motor, the object-holding arm including an elongated member having a proximal end portion connected to the motor and a distal end portion disposed upwardly from the motor-supporting structure;

an animal-attracting object connected to the distal end portion of the elongated member; and means for powering the electric motor in order to rotate the object-holding arm and thereby move the animal-attracting object;

said animal-attracting apparatus further comprising at least four base-stabilizing members on the base that are rotatable by a user from deployed positions, in which the base-stabilizing members extend outwardly from the base, to storage positions in which the base-stabilizing members are retracted from the deployed positions.

14. An animal-attracting apparatus, comprising:

a base having a hollow interior;

a motor-supporting structure having a central axis and a hollow interior extending along the central axis, which motor-supporting structure is connected to the base and so arranged that with the base resting on a horizontal support surface, the motor-supporting structure extends upwardly from the base with the central axis disposed vertically;

an electric motor located within the hollow interior of the motor-supporting structure in alignment with the central axis;

a object-holding arm connected to the motor, the object-holding arm including an elongated member having a proximal end portion connected to the motor and a distal end portion disposed upwardly from the motor-supporting structure;

an animal-attracting object connected to the distal end portion of the elongated member; and means for powering the electric motor in order to rotate the object-holding arm and thereby move the animal-attracting object;

wherein the motor includes a shaft extending upwardly from the motor-supporting structure to a terminal end portion of the shaft; and wherein the proximal end portion of the elongated member is adapted to be removably attached to the terminal end portion of the shaft in slide-on engagement of the terminal end portion in order to facilitate replacement of the object-holding arm.

* * * * *